April 29, 1930.                J. F. WHITE                1,756,015
                            ANIMAL RACING LURE
                            Filed Nov. 22, 1926
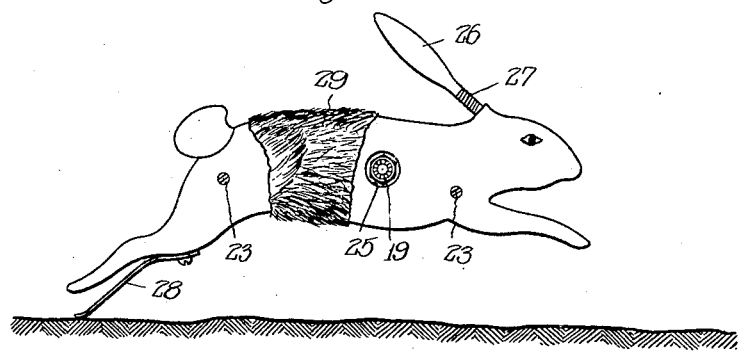
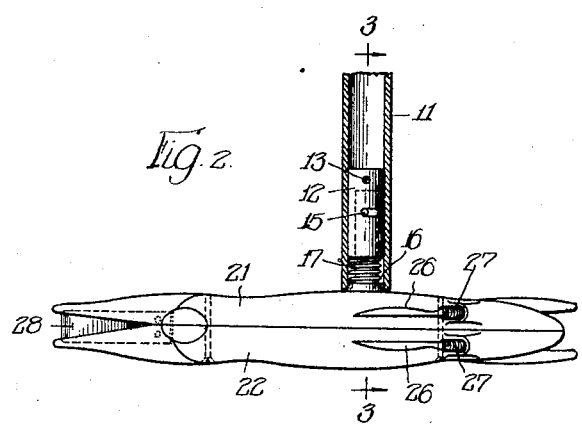
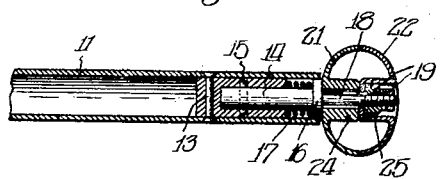
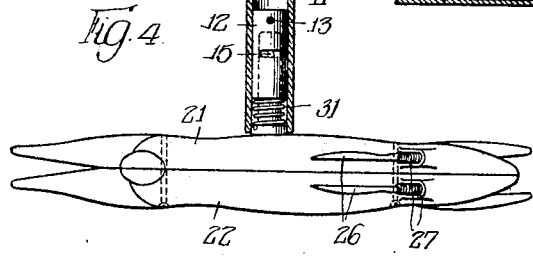
Inventor:
John F. White
By Walter M. Fuller
         atty.

Patented Apr. 29, 1930

1,756,015

UNITED STATES PATENT OFFICE

JOHN F. WHITE, OF CHICAGO, ILLINOIS, ASSIGNOR TO HARRY B. STAVER, OF CHICAGO, ILLINOIS

ANIMAL-RACING LURE

Application filed November 22, 1926. Serial No. 149,803.

My invention concerns certain features of novelty, both structural and functional, in lures, baits or decoys, such as are commonly used in animal races as incentives to the animals to exert their best speed efforts.

Such lures, for example rabbits, are usually mounted on outstanding arms of vehicles or cars which are caused to travel at a suitable speed over the race-course in appropriate advance of the animals participating in the race, whereby such animals are induced to develop and display their best racing forms in their pursuit of the decoy.

One object of the present invention is to provide a lure or bait of this general type and mounted in such a way that it will bound during its travel in direct simulation of the jumps of a live rabbit, and thus present a more deceptive counterfeiting of an actual, pursued animal.

Another purpose of the invention is to supply a device of this kind which is simple in structure, effective in results, economical to produce and unlikely to become damaged in ordinary service.

To enable those skilled in this art to fully understand the invention and its numerous advantages, desirable embodiments of the same have been presented in the accompanying drawing forming a part of this specification, and throughout the several views of which like reference characters have been employed to designate the same parts of the appliance.

In this drawing:—

Fig. 1 is a side elevation of the lure or decoy with its outer covering partially removed;

Fig. 2 is a plan view of the structure shown in Fig. 1, and indicates how the lure is mounted on its supporting arm;

Fig. 3 is a vertical, sectional view on line 3—3 of Fig. 2; and

Fig. 4 is a view similar to Fig. 2, presenting a slightly modified structure.

Referring first to the species illustrated in detail in Figs. 1, 2 and 3, it will be perceived that the supporting or sustaining arm 11, mounted on and outstanding from a vehicle not shown, is of cylindrical, tubular form, its end accommodating a cylindrical block or plug 12 fixed therein by a pin 13 extended through registering openings in the two elements and having its ends headed over, as is customary practice.

The member 12 internally affords a bearing for a shaft 14 supplied with a cross pin 15 occupying slots in the element 12, such construction permitting a rocking action of the shaft 14, but preventing the latter from being withdrawn axially from the part 12 by which it is carried.

The shaft 14 has an enlargement 16 in the end of the tubular arm 11 and spaced outwardly beyond the corresponding end of the block 12, such space being occupied by a coiled spring 17, one end of which is fixed to the part 12, its other end being secured to the enlargement 16.

The lure, in the form of a rabbit, is rigidly mounted on the reduced, outwardly-extended part 18 of the shaft, and is held thereon by a pair of nuts 19 screwed on the threaded, terminal part of such section of the shaft.

The rabbit is composed of two hollow, longitudinal, aluminum sections 21 and 22 held together by a plurality of screws 23, 23, the inner section desirably having internally a hub 24 against which bears a similar, internal, mating hub 25, hollow, as shown in Fig. 3, to accommodate the nuts 19.

The ears 26, 26 of the rabbit may be made of any suitable material, and are desirably mounted on coiled springs 27, 27 joining them to the head of the animal, so that they may have movements independent of the head and body of the lure.

It will be observed that the hind legs extend downwardly toward the ground, and in order to relieve or subdue the shock incident to the contact of the rabbit with the ground as the lure is traveling along at relatively high speed, a cushion leaf-spring 28 of suitable shape, as shown in Fig. 1, is fastened at its upper end to the under side of the rabbit, its lower end projecting down below the animal's rear feet.

This lure is covered with a rabbit-skin 29, of which only a portion is shown in the drawings, and such covering may be secured in place either by cementing it on the body or lacing it on in any approved manner.

As is clearly indicated in the drawings, the point of mounting of the rabbit on the arm is forward of the center of gravity of the former, so that automatically under the action of gravity the rabbit's body tends to rock downwardly and rearwardly.

The operation of the appliance is practically as follows:

Assuming that the supporting 11 is being advanced over the raceway in any approved manner at a suitable speed, the rabbit, due to its own weight, rocks downwardly rearwardly until the spring 28 strikes the ground, whereupon the rabbit by such action receives an upward rocking impulse of substantial intensity, causing the decoy animal to rock around its support, its rear end moving upwardly and its front end turning downwardly in simulation of the jumping movements of a live rabbit.

In order to cushion such action the spring 17 is provided, and during the rocking action specified this spring is wound up or turned somewhat in the performance of its cushioning function, and as soon as it has absorbed the impulse imposed upon it, the rabbit rocks downwardly rearwardly again until it receives another shock by contact with the ground, which causes it to repeat the preceding movement, and in this way the false rabbit continues a series of leaping actions similar to those which a live rabbit would perform in jumping.

Owing to the fact that the rabbit's ears are mounted on springs, these can move or sway independently of the movements of the body, and hence give the animal a more life-like appearance in its rapid travel over the race-course.

In some cases it is not necessary that the lure shall actually contact with the ground in order to perform its leaping or rocking movements, since the vibration of the supporting arm 11 may be utilized to actuate the rabbit sufficiently to cause it to rock about a suitable center.

In Fig. 4 such a modified construction is shown, which is like the one already described except that the spring 31 is so mounted and arranged as to tend to maintain the rabbit in a horizontal position, in this instance the rabbit's body being pivotally mounted at its center of gravity.

As the animal moves along the raceway at a substantial speed, the vibration of the arm 11 will cause it to rock more or less forwardly and rearwardly, the spring acting as a cushion in either direction of movement and tending to hold the rabbit in a normal, horizontal position when the supporting arm is not undergoing vibratory movements due to its relatively-rapid, forward travel.

Stated somewhat otherwise, in this embodiment of the invention, the rabbit oscillates about its center of gravity due to the vibration of the arm, the spring constituting more or less of a cushion so that these movements will not be excessive, and normally holding the body in a horizontal relation.

The invention is not limited and restricted to the precise and exact details of structure, and these may be modified within comparatively wide limits without departure from the heart and essence of the invention and without the sacrifice of any of its substantial benefits and advantages.

I claim:

1. The combination of a lure, a support adapted to travel over a race course, means rockingly mounting said lure forwardly of its center of gravity on the support in such position as to coact with the ground, a spring mounted on said lure to cushion the contacts of the latter with the ground, whereby the engagements of said spring with the ground during the travel of the support will cause the rear part of the lure to rock upwardly and its front part downwardly in simulation of the jumping actions of a live animal, and another spring associated with said lure to cushion the upward movement of the rear part of the same.

2. The combination of a lure, a support adapted to travel over a race course, means rockingly mounting said lure forwardly of its center of gravity on the support, a leaf-spring mounted on said lure in a position to contact with the ground when the lure swings downwardly under the action of gravity, whereby the contacts of the leaf-spring with the ground during the travel of the support will cause the rear part of the lure to rock upwardly and its front part downwardly in simulation of the jumping actions of a live animal, and torsional spring means to cushion such upward rocking movements of the lure.

In witness whereof I have hereunto set my hand.

JOHN F. WHITE.